(12) United States Patent
Kelbas et al.

(10) Patent No.: US 7,184,373 B2
(45) Date of Patent: Feb. 27, 2007

(54) ADAPTIVE FOCUSING METHOD AND APPARATUS

(75) Inventors: Dmytro Kelbas, Gyeonggi-do (KR); Byung-in Ma, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 10/677,147

(22) Filed: Oct. 2, 2003

(65) Prior Publication Data

US 2004/0130980 A1 Jul. 8, 2004

(30) Foreign Application Priority Data

Oct. 7, 2002 (KR) .................. 10-2002-0061084

(51) Int. Cl.
*G11B 7/00* (2006.01)

(52) U.S. Cl. .................................. 369/44.26
(58) Field of Classification Search ............ 369/44.25, 369/44.26, 44.27, 44.36, 94
See application file for complete search history.

(56) References Cited

U.S. PATENT DOCUMENTS 6,192,010 B1  2/2001  Wang et al.
6,392,971 B1  5/2002  Takiguchi et al.
6,434,094 B2 *  8/2002  Yamada et al. .......... 369/44.26
6,449,232 B1  9/2002  Kuwahara et al.

FOREIGN PATENT DOCUMENTS

EP        0813192       12/1997
JP        63-44324       2/1988
JP        10-228717      8/1998
WO    WO 02/059888 A2    8/2002

OTHER PUBLICATIONS

European Search Report dated Oct. 25, 2004.

* cited by examiner

*Primary Examiner*—Nabil Hindi
(74) *Attorney, Agent, or Firm*—Stein, McEwen & Bui, LLP

(57) ABSTRACT

An adaptive focusing apparatus and method thereof of an optical disc drive having a focus servo controller moves a pickup head to an optimal focus point. A disc driver rotates an optical disc and includes a reflected signal detector detecting a signal reflected from the optical disc by the pickup head and a signal processor preventing spikes between a surface of the optical disc and the pickup head in response to the reflected signal and generating a focus drive signal for the focus servo controller using an adaptive focus search algorithm. The algorithm includes a static part and a dynamic part to reduce a focus search time. Accordingly, damage to the optical disc due to spikes between the surface of the optical disc and the pickup head can be prevented and a focus search time can be reduced.

42 Claims, 4 Drawing Sheets

ADAPTIVE FOCUSING METHOD AND APPARATUS

CROSS-REFERENCE TO RELATED APPLICATIONS

This application claims the priority of Korean Patent Application No. 2002-61084, filed on Oct. 7, 2002, in the Korean Intellectual Property Office, the disclosure of which is incorporated herein in its entirety by reference.

BACKGROUND OF THE INVENTION

1. Field of the Invention

The present invention relates to the field of controlling an optical disc drive, and more particularly, to an adaptive focusing method and apparatus to control an optical disc drive using an adaptive focus search algorithm.

2. Description of the Related Art

An optical disc is a mass storage medium that can hold up to several tens gigabytes of binary data in an inexpensive plastic disc. Due to a large capacity of the optical disc, the optical disc is widely used as a major data storage medium in the computer field and multimedia devices.

An optical disc drive includes a large number of component parts including motors, actuators, and optical and electronic components. Many control algorithms are used to control motors and actuators to move a pickup head in a proper way so as to access a recording layer on a disc surface. One of problems of the control algorithms is to focus a laser beam onto the surface of the optical disc. More particularly, the control algorithms have a problem with detecting and adjusting an optimal focus point of the pickup head.

In conventional optical pickup heads, a laser diode is used to generate the laser beam to be radiated onto a data area (i.e., the recording layer) of the optical disc. A photo sensor, which generates opto-electrical signals representing focusing/tracking errors in the optical pickup heads, detects the laser beam reflected from the surface of the optical disc. The photo sensor includes a number of separate light sensitive areas. Some of the light sensitive areas is used to generate a focusing error signal (FES). The FES is used in servo control algorithms to detect and adjust the pickup head to correct a focusing position. A control signal of a focus actuator is referred to as a focus drive signal (FOD).

FIG. 1 is a time diagram illustrating a process including a general focusing algorithm used in the optical disc drive. At an initial stage, the pickup head moves from a central position 0.0 (0-state) toward a lowermost position (1-state). When the pickup head reaches the lowermost position (1-state), the pickup head goes to the uppermost position (2-state) to make a saw-tooth pulse movement. When the pickup head arrives at the uppermost position (2-state), the pickup head goes back to the lowermost position (1-state) and then repeats the process of going to the 2-state and back to the 1-state until the pickup head stably achieves focusing. This procedure is called a focus search. 'FODTOPMARGN' is a constant to define a maximum value of the FOD during a focus search and 'FODBOTMARGN' is a constant to define a minimum value of the FOD during the focus search. 'FODMAGNSTEP' and 'FODTIMESTEP' are constants to determine a velocity of the focus actuator, i.e., constants to define fixed distance intervals for a smallest change in the FOD and time intervals between closest changes in the FOD, respectively.

When the pickup head approaches the focus point, the FES changes like S-curves shown in FIG. 2. A center of the S-curves corresponds to the focus point of the pickup head and a number of S-curves is equal to a number of layers of an optical disc.

However, a high-density optical disc uses an objective lens having a small numerical aperture (NA) and has a small gap between the surface and a recording layer of the high-density optical disc. Thus, a focal length of the objective lens decreases and an allowance of a vertical distortion of the high-density optical disc increases. As a result, when the general focusing algorithm presented in FIG. 1 is used, the objective lens is highly likely to scratch or damage the surface of the high-density optical disc. A searching time is long until the stable focusing is attained in an initial search for a focus point and after losing the focus due to dirt on and damage to the surface of the high-density optical disc.

Documents describing conventional focusing algorithms include International Patent Application No. WO 02/59888, entitled "Optical Disk Drive with Digital Focus and Tracking Servo System", U.S. patent application Ser. No. 6,192,010, entitled "Apparatus and Method for Adjusting Pickup Head of Optical Disc Drive to Optimal Focus Point", and U.S. patent application Ser. No. 6,392,971, entitled "Focus control Method and Optical Disc Recording/Reproducing Apparatus".

SUMMARY OF THE INVENTION

According to an aspect of the present invention, there is provided an adaptive focusing method and apparatus of a high-density optical disc where a gap between a surface and a recording layer is small.

According to an aspect of the present invention, there is also provided an adaptive focusing method and apparatus to prevent an objective lens of a pickup head from scratching or damaging a surface of an optical disc during a search for a focus point.

According to an aspect of the present invention, there is also provided an adaptive focusing method and apparatus to search for a focus point within a short period of time right before focusing or in an initial state.

According to an aspect of the present invention, there is also provided an adaptive focusing method and apparatus to search for a focus point within a short period of time after a focus point loosing event during a focus search.

Additional aspects and/or advantages of the invention will be set forth in part in the description which follows and, in part, will be obvious from the description, or may be learned by practice of the invention.

According to an aspect of the present invention, there is provided an adaptive focusing method for a static part in which an optical disc is not driven and a pickup head operates in an optical disc drive. The pickup head falls from the optical disc to a minimum value of a focus drive signal during a focus search operation. When the pickup head reaches the minimum value of the focus drive signal, the pickup head rises close to the optical disc and then to a maximum allowable value of the focus drive signal when a signal reflected from the optical disc is detected. When the pickup head reaches the maximum allowable value of the focus drive signal, the pickup head falls from the optical disc to a minimum allowable value of the focus drive signal.

According to another aspect of the present invention, there is provided an adaptive focusing method of a dynamic part in which a focus is deviated when both a disc driver and a pick head operate in an optical disc drive. A pickup head rises from a lowermost position from a surface of an optical disc and then to a maximum allowable value of a focus drive signal when a signal reflected from the optical disc is detected. When the pickup head reaches the maximum allowable value of the focus drive signal, the pickup head falls from the optical disc to a minimum allowable value of the focus drive signal.

According to still another aspect of the present invention, there is provided an adaptive focusing apparatus of an optical disc drive including a focus servo controller that moves a pickup head to an optimal focus point and a disc driver that rotates an optical disc. The adaptive focusing apparatus includes a reflected signal detector that detects a signal reflected from the optical disc by the pickup head and a signal processor that prevents spikes between a surface of the optical disc and the pickup head in response to the reflected signal and generates a focus drive signal for the focus servo controller using an adaptive focus search algorithm including a static part and a dynamic part to reduce a focus search time.

BRIEF DESCRIPTION OF THE DRAWINGS

These and/or other aspects and advantages of the invention will become apparent and more readily appreciated from the following description of the exemplary aspects taken in conjunction with the accompanying drawings in which.

DETAILED DESCRIPTION OF THE PREFERRED EMBODIMENTS

Figure 1:
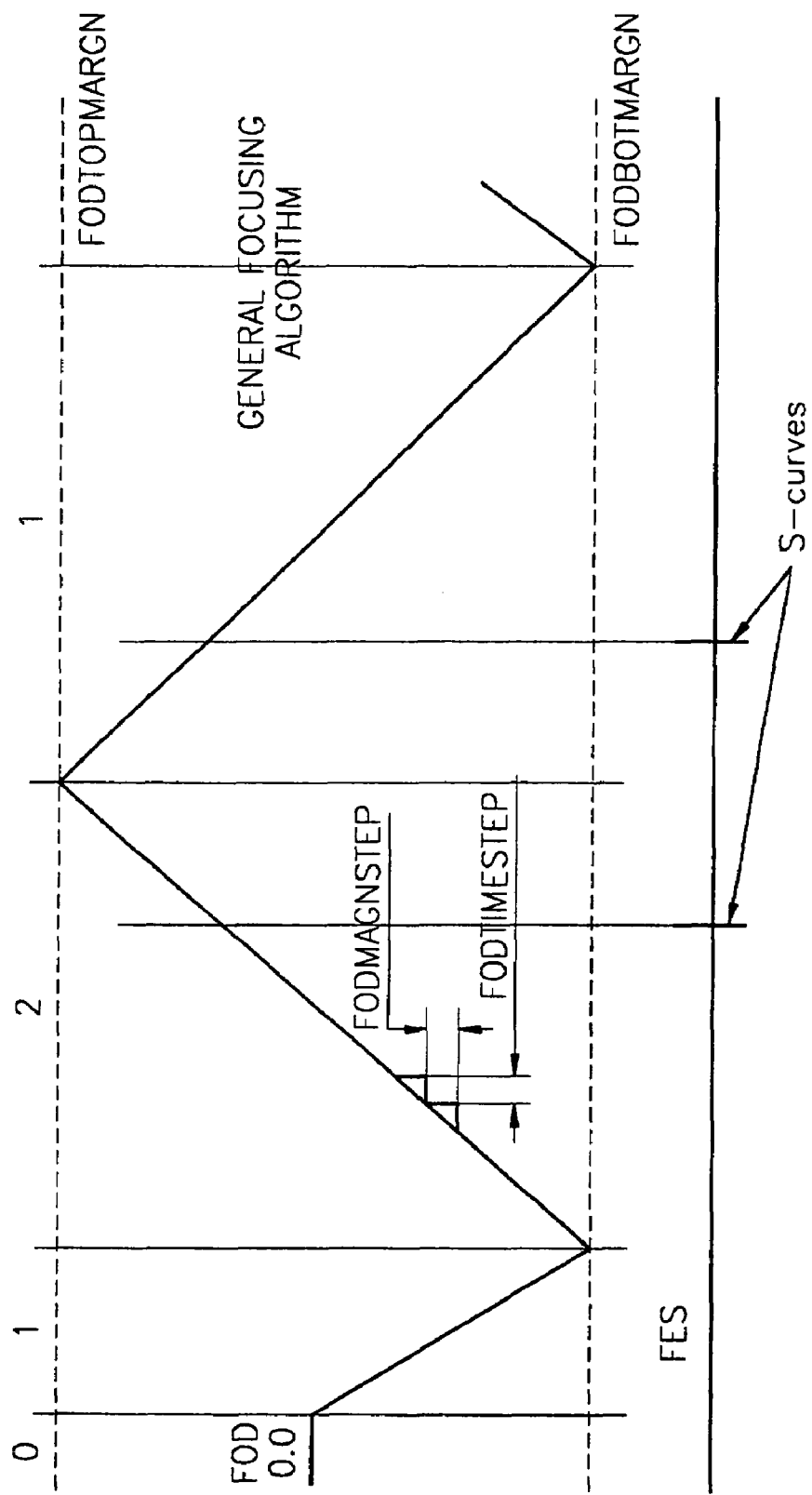
FIG. 1 is a time diagram of a general focusing algorithm.
Figure 2:
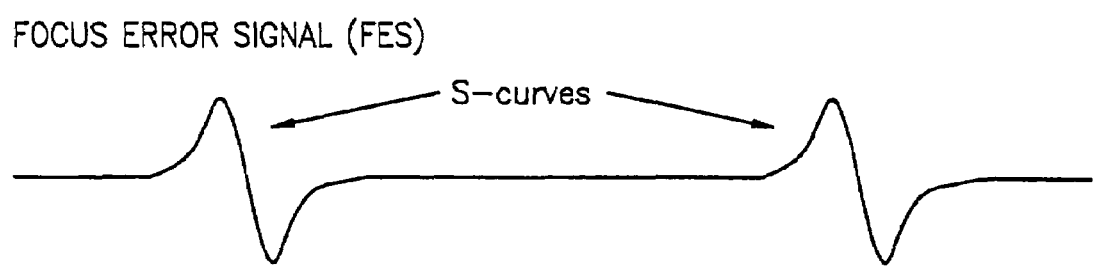
FIG. 2 illustrates a FES curving in an S shape when a pickup head approaches a focus point.

Reference will now be made in detail to the aspects of the present invention, examples of which are illustrated in the accompanying drawings, wherein like reference numerals refer to the like elements throughout. The aspects are described below to explain the present invention by referring to the figures.

Figure 3:
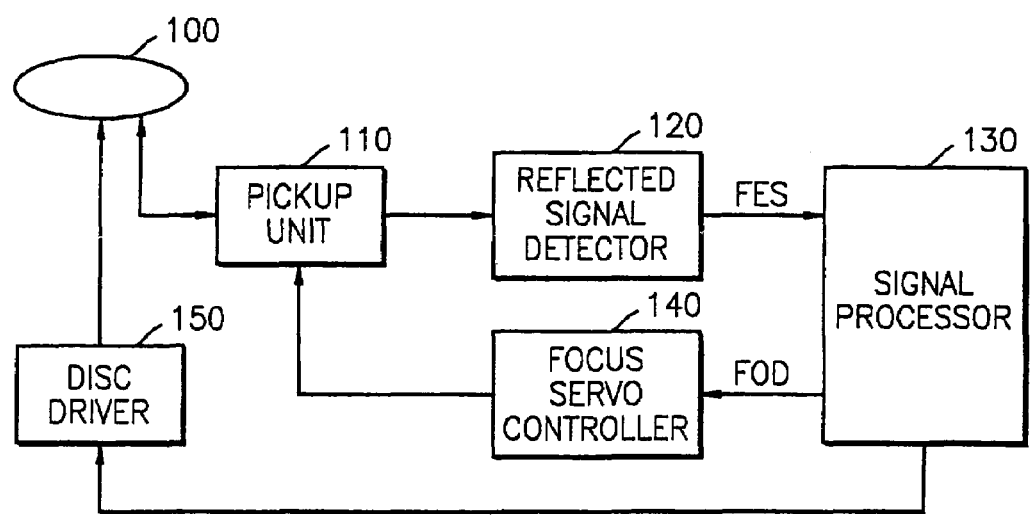
FIG. 3 is a schematic block diagram of an optical disc drive to which an adaptive focusing method is applied, according to an aspect of the present invention.

FIG. 3 is a schematic block diagram of an optical disc drive to which an adaptive focusing method is applied, according to the present invention. Reference numeral 100 denotes a disc, reference numeral 110 denotes a pickup unit, which can also be referred to as a pickup head, including an optical system including a laser diode, an objective lens, a photo sensor, and the like, and reference numeral 120 denotes a reflected signal detector which detects a reflected signal from the photo sensor. Reference numeral 130 denotes a signal processor which generates a signal to drive the optical disc drive using an adaptive focus search algorithm, including a static part and a dynamic part, that prevents spikes from a surface of the disc 100 and the objective lens and reduces a focus search time. Reference numeral 140 denotes a focus servo controller including a focus actuator, which keeps a gap between the objective lens and a recording layer of the disc 100 in a focus-in state, and so forth. Reference numeral 150 denotes a disc driver including a spindle motor, which rotates the disc 100, and the like.

The adaptive focus search algorithm, which can be realized as software in a controller (not shown) of the signal processor 130 or in the signal processor 130, is divided into two parts. The first part is the static part used before starting focusing or in initialization. In the static part, for illustrative purposes, the spindle motor of the disc driver 150 is motionless and the focus actuator of the focus servo controller 140 has an adaptive swing margin. A swing margin of the focus actuator can be calculated every pass of the pickup head depending on an actual position of a center of S-curves or a focus point and may be an absolute swing margin to prevent damage to the optical system in the absence of an FES feedback signal. The static part does not allow the rotation of the spindle motor and is proposed to check a type of disc and a number of layers and to adjust an FES gain coefficient.

The second part is the dynamic part, which should be used only when the disc 100 rotates in synchronization with a velocity of the spindle motor of the disc driver 150 and when a focus is suddenly deviated due to outer disturbances, an unstable operation of the optical system, damage to the disc 100, or the like during a normal operation. The dynamic part assumes that an actual value of a focus drive signal (FOD) indicates a lowest position of the surface of the disc 100. The actual value of the FOD is a minimum value of a low-pass filtered FOD value with a cut-off frequency of about a rotation frequency of the spindle motor. The minimum value of the low-pass filtered FOD value provides information about a safe area for the pickup head and a place to start an iteration of the focus search.

Figure 4:
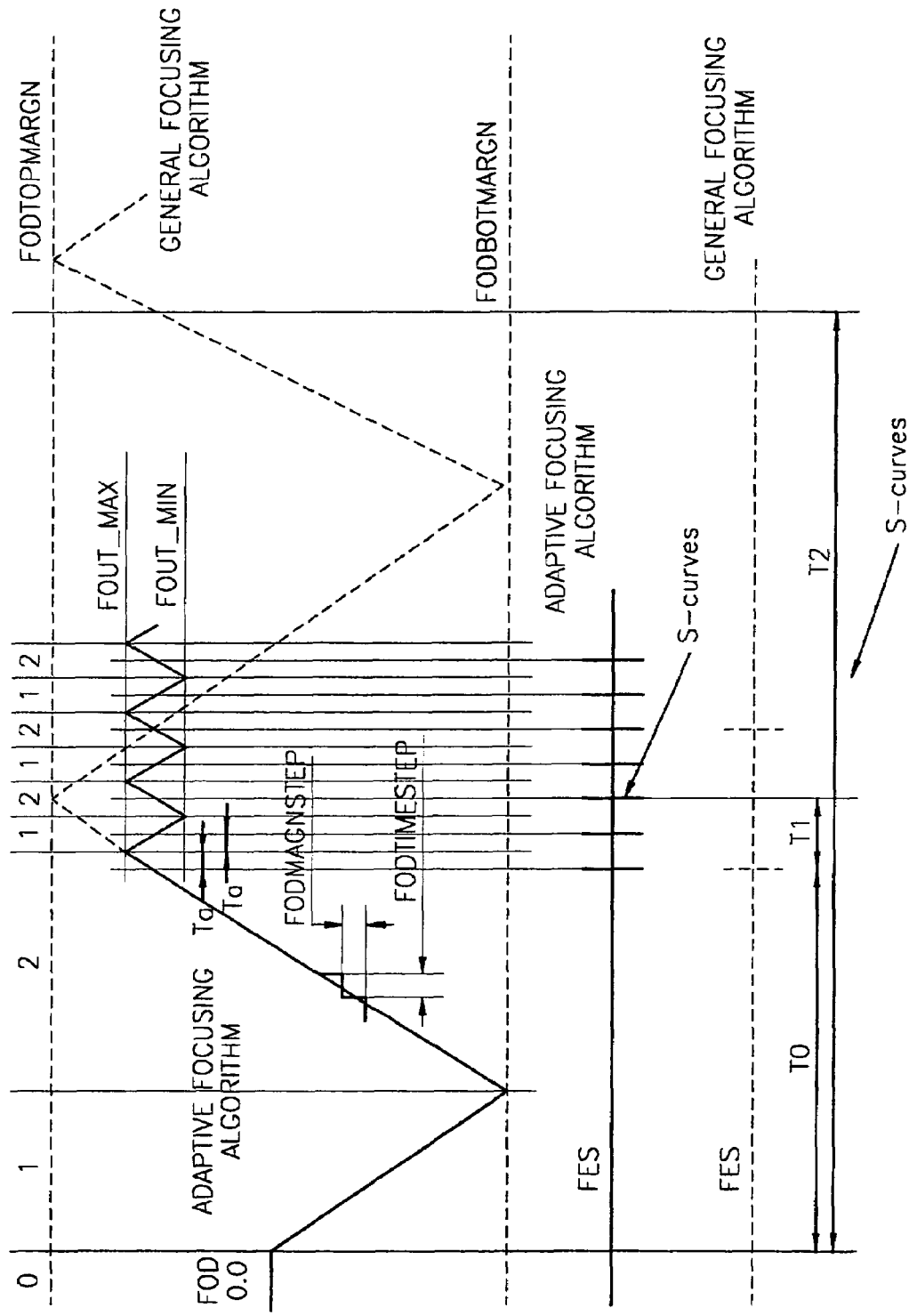
FIG. 4 is a time diagram of an adaptive focus search algorithm, according to an aspect of the present invention.

FIG. 4 is a time diagram of the adaptive focus search algorithm, according to an aspect of the present invention, and particularly, a time diagram of the FES and the FOD when performing the static part in which the disc 100 does not rotate and only the pickup head operates. The adaptive focus search algorithm will be described with reference to the optical disc drive shown in FIG. 3.

The static part of the adaptive focus search algorithm has three states, i.e., 0-state, 1-state, and 2-state. The 0-state indicates that the optical disc drive is positioned at a central point where the FOD is zero, the 1-state represents a descending region of the FOD, and the 2-state represents an ascending region of the FOD.

In other words, in the static part, the controller of the signal processor 130 controls the pickup head at the central point (i.e., in the 0-state) so as to move to the lowest position according to the FOD provided from the focus servo controller 140 in order to form the descending region (i.e., in the 1-state) of the FOD. The bottom margin of the FOD is defined by a constant FODBOTMARGN, which is set so as to get a large enough margin in consideration of a vertical distortion of the objective lens. A descending speed of the FOD is defined by constants FODMAGNSTEP and FODTIMESTEP.

When the pickup head reaches the lowest position, the ascending region (i.e., the 2-state) of the FOD is formed. In the ascending region, it may be determined whether the signal is reflected from the disc 100. For example, in the ascending region, it may be determined whether the FES has the S-curves and whether a sum signal, which is called a radio frequency (RF) signal of the signals picked up by the pickup unit 110, can be used.

In other words, the laser diode of the pickup unit 110 is used to generate a laser beam to be radiated onto the recording layer of the disc 100. The photo sensor, which generates opto-electrical signals representing focusing/ tracking errors in the pickup head, detects the laser beam reflected from the surface and the recording layer of the disc 100. The photo sensor has a number of separate light sensitive areas and the reflected signal detector 120 detects a portion of the reflected laser beam as the FES or detects the sum signal (i.e., the RF signal) to use the FES signal or the sum signal in the adaptive focus search algorithm.

The signal detector 130 analog-to-digitalconverts the reflected signal (FES) detected by the reflected signal reflector 120 to obtain an actual value of the FES and low-pass filters the actual value of the FES, so that the controller can check whether the disc 100 is loaded, a type of disc, a number of layers of the disc 100 and adjust an FES gain coefficient using the actual value of the FES. The controller digital-to-analogconverts the FOD value calculated by variables and constants used in the adaptive focus search algorithm presented in FIG. 4 and, then, provides the FOD value to the focus servo controller 140.

The prevention of the spikes between the disc 100 and the objective lens of the pickup unit 110 is achieved by checking a rising part period of the S-curves of the FES. In an existing focus search algorithm, a result thereof marked with dotted lines in FIG. 4, a rising region of an FOD depends on a constant FODTOPMARGN. In the adaptive focus search algorithm, according to an aspect of the present invention, the ascending region of the FOD rises up to a maximum allowable value FOUT_MAX of the FOD, which corresponds to a maximum focus search voltage. The maximum allowable value FOUT_MAX exists within the constant FODTOPMARGN. When the pickup head reaches the maximum allowable value FOUT_MAX of the FOD, the descending region of the FOD is formed. In the existing focus search algorithm, the descending region of the FOD depends on a constant FODBOTMARGN. In the adaptive focus search algorithm, according to an aspect of the present invention, the descending region of the FOD is formed to a minimum allowable value FOUT_MIN (which corresponds to a minimum focus search voltage). The minimum allowable value FOUT_MIN exists within a constant FODBOTMARGN. When the pickup head reaches the minimum allowable value FOUT_MIN of the FOD, the ascending region of the FOD is re-formed. A number of times the descending region (i.e., the 1-state) with the ascending region of the FOD and the ascending region (i.e., the 2-state) with the descending region of the FOD are repeated after the reflected signal is detected is determined in consideration of the stability of focusing.

After the reflected signal is detected, a section Ta representing an amount of the movement of the pickup head, i.e., a section ranging from a rising part of an S-curve to the maximum allowable value FOUT_MAX (which corresponds to a focus point) or from the maximum allowable value FOUT_MAX to a falling part of the S-curve, may be set to be a fixed value. The section Ta may be adaptively set in proportion to a time interval from the reflection of the signal from the surface of the disc 100 to the reflection of the signal from the recording layer of the disc 100 or may be adaptively set using a peak-to-peak time of the FES with the S-curves. The set section Ta contributes to the prevention of the pickup head's touching the surface of the disc 100 and a reduction in the time required to search for the focus point using an adaptive margin of the FOD.

At the bottom of FIG. 4, a focus point access time according to the general focus search algorithm and the focus point access time, according to an aspect of the adaptive focus search algorithm of the present invention, are shown. A time interval T0 necessary to obtain a first S-curve is the same in both the general focus search algorithm and the adaptive focus search algorithm. An access time between the first S-curve and a third S-curve is T2 in the general focus search algorithm, but T1 in the adaptive focus search algorithm, where T1<T2. Accordingly, according to an aspect of the present invention, an actual swing margin (i.e., a vertical deviation) of the pickup head is adaptive during a focus search operation to prevent the pickup head from touching the surface of the disc 100 due to outer disturbances and the time required for searching for a focus point is reduced.

FIGS. 5A through 5D are time diagrams of the adaptive focus search algorithm, according to another aspect of the present invention, i.e., a time diagram of a profile of the FES and the FOD when performing the dynamic part in which the disc 100 and the pickup head operate, a timing diagram of driving clock pulses of the spindle motor, and a timing diagram of the vertical deviation of the disc 100. The focus search algorithm will be described with reference to the optical disc drive shown in FIG. 3.

Figures 5A, 5B, 5C, 5D:
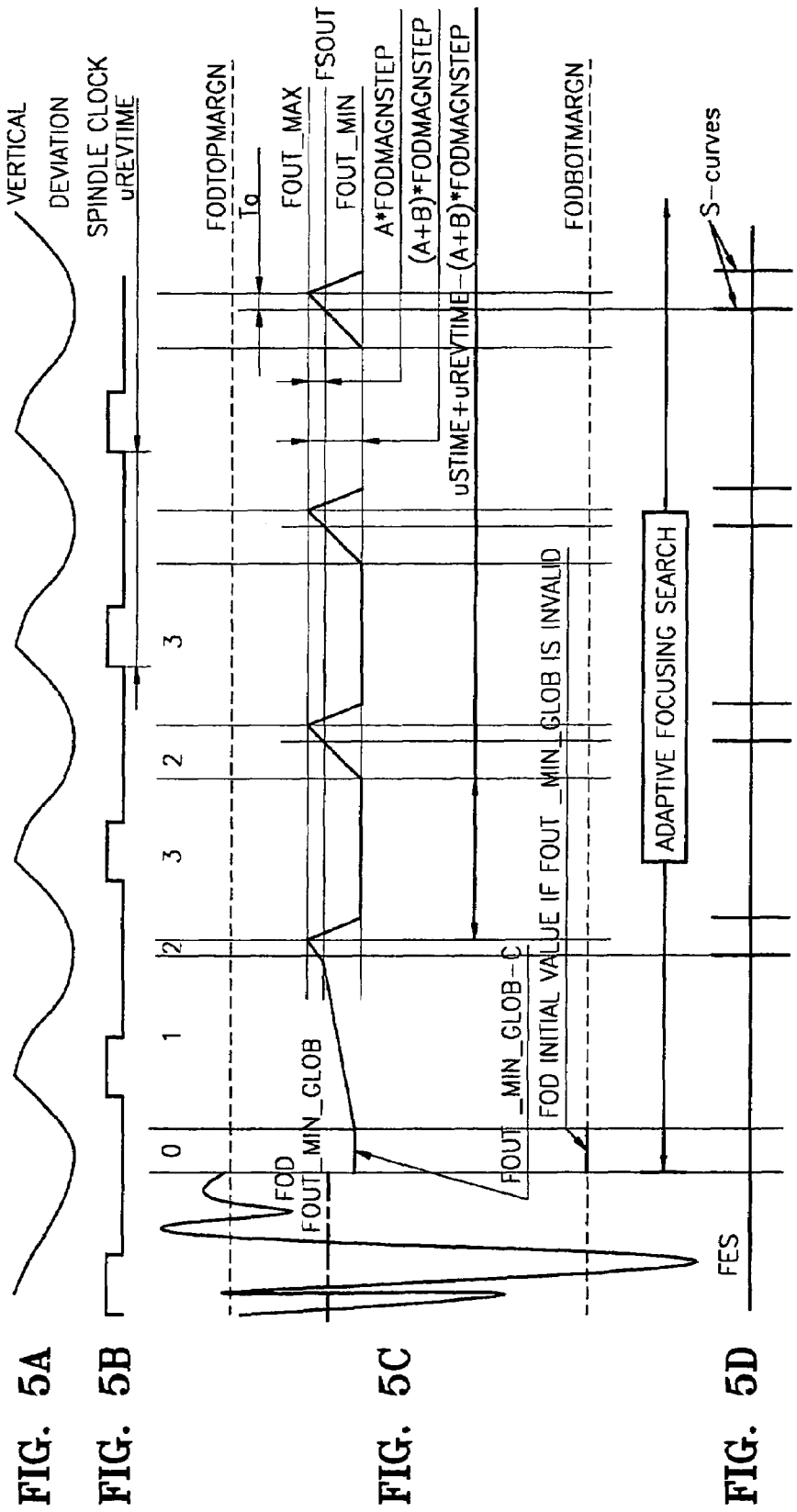
FIGS. 5A through 5D are time diagrams of the adaptive focus search algorithm, according to another aspect of the present invention.

FIG. 5A shows a profile of the vertical deviation of the disc 100 during the rotation of the disc 100, and FIG. 5B shows the driving clock pulses of the spindle motor generated by the disc driver 150, which rotates the disc 100. FIG. 5C is the timing diagram of the FOD, and FIG. 5D is the timing diagram of the FES.

According to the dynamic part of the adaptive focus search algorithm, although focusing deviates during the operation of the disc 100 due to outer disturbances, the vertical deviation (FIG. 5A) of the disc 100 can be predicted. Thus, the FOD, which is referred to as a focus search voltage, is adjusted so that the disc 100 enters a closest focus position. Four states of the FOD, i.e., the 0-state, the 1-state, the 2-state, and a 3-state, will be described below.

In the 0-state, a time delay is created to prevent false conditions caused by possible false S-curves of the FES due to the unpredictable relative positions of the pickup head and the surface of the disc 100. A current output FSOUT of the FOD is initialized and the maximum allowable value FOUT_MAX of the FOD is set to be an initial margin. In other words, an initial value of the maximum allowable value FOUT_MAX of the FOD is equal to a variable FOUT_MIN_GLOB and depends on a previous state of a focus servo system of the optical disc drive. When the previous state of the focus servo system is an on-focus state, the variable FOUT_MIN_GLOB has a minimum filtered FOD value, which corresponds to a lowermost position of the surface of the disc 100. When the previous state of the focus servo system is not the on-focus state, the variable FOUT_MIN_GLOB has a constant FODBOTMARGN to prevent the touching of the disc 100. In FIG. 5C, FOUT_MIN_GLOB_C is a constant to define a fixed distance interval for an initial position of the FOD in a starting portion of the dynamic part of the adaptive focus search algorithm.

The 1-state forms a slowly ascending region of the FOD with a rising velocity of at least predetermined times (e.g., 10 times) less than the rising velocity of the pickup head. A vertical rising velocity of the pickup head is set to be less than a vertical deviation velocity of the surface of the disc 100 shown in FIG. 5A.

If the S-curve of the FOD is found, the voltage FSOUT of the FOD is stored and a time uSTIME to keep a latest moment an S-curve is found is stored. Further, a new top margin FOUT_MAX is calculated as a focus point A*FODTIMESTEP, and the 1-state is switched to the 2-state. When no S-curves are found, the 1-state is switched to the 0-state so as to start the dynamic part from an initial state.

The 2-state forms the ascending region of the FOD. During the 2-state, the FES having the S-curves is checked. When the S-curve is found, the new top margin FOUT_MAX is calculated as the focus point A*FODMAGNSTEP, where A is a constant. In this calculation, the time and the distance of the movement of the pickup head are fixed in the 2-state.

The 3-state forms the descending and flat horizontal regions of the FOD. The descending region quickly moves the pickup head from a dangerous area to a safe position and the flat region keeps the pickup head in a stand-by state. A stand-by state duration is calculated by uSTIME (a last instant of time when an S-curve is found)+uREVTIME (revolution interval of the spindle motor)−(A+B)*FODTIMSTEP. Here, B is a constant to define a fixed distance interval to keep the pickup head below the lowermost position of the surface of the disc 100. After the 3-state, the 3-state is switched to the 2-state, and then the states are repeated in the order of the 2-state, the 3-state, the 2-state, the 3-state, etc. to search for the focus.

Accordingly, the dynamic part of the focus search algorithm uses information about a revolution time of the spindle motor, a current time, and a moment of a safe lowermost potion of the surface of the disc 100 to synchronize the moment of getting the S-curves and the lowermost position of the surface of the disc 100, which leads to a safe, unbreakable focus search algorithm. Also, the focus search time required to enter the safe focus state can be reduced.

As described above, according to an aspect, the present invention is suitable for a high-density optical disc in which a gap between a surface and the recording layer is narrow. Also, an objective lens of a pickup head can be prevented from scratching or damaging the surface of the high-density optical disc during a search for a focus point. A time required to search for the focus point can be reduced right before starting focusing or in an initial state. Moreover, after losing the focus point in a normal operation, the search for the focus point is possible within a short period of time. As a result, stability and reliability of an optical system may be improved.

A focus search algorithm proposed in the present invention is suitable for a high-density optical disc and can be realized in a digital signal processor, a microprocessor, or the like without any additional hardware cost.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. An adaptive focusing method of a static part in which an optical disc is not driven and a pickup head operates in an optical disc drive, the adaptive focusing method comprising:
   allowing the pickup head to fall from the optical disc to a minimum value of a focus drive signal during a focus search operation;
   allowing the pickup head to rise close to the optical disc and to a maximum allowable value of the focus drive signal when a signal reflected from the optical disc is detected when the pickup head reaches the minimum value of the focus drive signal; and
   allowing the pickup head to fall from the optical disc to a minimum allowable value of the focus drive signal when the pickup head reaches the maximum allowable value of the focus drive signal.

2. The adaptive focusing method of claim 1, wherein the maximum allowable value of the focus drive signal is within a maximum value of the focus drive signal during the focus search operation, and the minimum allowable value of the focus drive signal is within the minimum value of the focus drive signal during the focus search operation.

3. The adaptive focusing method of claim 1, further comprising:
   repeating the rise of the pickup head to the maximum allowable value of the focus drive signal and the fall of the pickup head to the minimum allowable value of the focus drive signal after the fall of the pickup head to the minimum allowable value of the focus drive signal.

4. The adaptive focusing method of claim 1, wherein a vertical deviation of the pickup head to the maximum allowable value of the focus drive signal after the reflected signal is detected is set to be a fixed value.

5. The adaptive focusing method of claim 1, wherein a vertical deviation of the pickup head to the maximum allowable value of the focus drive signal after the reflected signal is detected is set in proportion to a time interval from the reflection of the signal from a surface of the optical disc to the reflection of the signal from a recording layer of the optical disc.

6. The adaptive focusing method of claim 1, wherein the reflected signal is a focus error signal that is a portion of a signal detected by the pickup head.

7. The adaptive focusing method of claim 1, wherein the reflected signal is a sum signal of signals detected by the pickup head.

8. The adaptive focusing method of claim 6, wherein a vertical deviation of the pickup head to the maximum allowable value of the focus drive signal after the reflected signal is detected is set by detecting a peak-to-peak time of the focus error signal.

9. The adaptive focusing method of claim 6, wherein the static part performs the focus search operation prior to a start of focusing or in an initialization operation, and checks whether the optical disc is loaded, a type of optical disc, a number of layers of the optical disc and adjust a gain coefficient of the focus error signal, using the signal reflected.

10. An adaptive focusing method of a dynamic part in which a focus is deviated when both a disc driver and a pickup head operate in an optical disc drive of an optical disc, the adaptive focusing method comprising:
    allowing the pickup head to rise from a lowermost position of a surface of the optical disc and to a maximum allowable value of a focus drive signal when a signal reflected from the optical disc is detected; and
    allowing the pickup head to fall from the optical disc to a minimum allowable value of the focus drive signal when the pickup head reaches the maximum allowable value of the focus drive signal.

11. The adaptive focusing method of claim 10, further comprising allowing the pickup head to stand-by at the minimum allowable value of the focus drive signal for a predetermined period of time before the rise of the pickup head to the maximum allowable value of the focus drive signal.

12. The adaptive focusing method of claim 11, wherein when a previous state of the optical disc drive is not an on-focus state, the pickup head stands-by at the minimum allowable value of the focus drive signal so as not to touch the optical disc.

13. The adaptive focusing method of claim 10, wherein the lowermost position of the surface of the optical disc corresponds to the minimum allowable value of the focus drive signal.

14. The adaptive focusing method of claim 10, wherein the maximum allowable value of the focus drive signal is within a maximum value of the focus drive signal during a focus search operation, and the minimum allowable value of the focus drive signal is within a minimum value of the focus drive signal during the focus search operation.

15. The adaptive focusing method of claim 10, wherein a vertical deviation of the pickup head to the maximum allowable value of the focus drive signal after the reflected signal is detected is set to be a fixed value.

16. The adaptive focusing method of claim 10, wherein a vertical deviation of the pickup head to the maximum allowable value of the focus drive signal after the reflected signal is detected is set in proportional to a time interval from the reflection of the signal from the surface of the optical disc to the reflection of the signal from a recording layer.

17. The adaptive focusing method of claim 10, wherein the reflected signal is a focus error signal that is a portion of a signal detected by the pickup head.

18. The adaptive focusing method of claim 10, wherein the reflected signal is a sum signal of signals detected by the pickup head.

19. The adaptive focusing method of claim 17, wherein a vertical deviation of the pickup head to the maximum allowable value of the focus drive signal after the reflected signal is detected is adaptively set by detecting a peak-to-peak time of the focus error signal.

20. The adaptive focusing method of claim 10, wherein the rise of the pickup head to the maximum allowable value of the focus drive signal comprises:

allowing the pickup head to rise at a slower speed than a vertical deviation speed of the optical disc; and allowing the pickup head to rise to the maximum allowable value of the focus drive signal when the signal reflected from the optical disc is detected.

21. The adaptive focusing method of claim 20, wherein the fall of the pickup head to the minimum allowable value of the focus drive signal comprises:

allowing the pickup head to fall from the optical disc to the minimum allowable value of the focus drive signal when the pickup head reaches the maximum allowable value of the focus drive signal; and allowing the pickup head to stand-by at the minimum allowable value of the focus drive signal for a predetermined period of time when the pickup head reaches the minimum allowable value of the focus drive signal.

22. The adaptive focusing method of claim 21, further comprising:

repeating the rise of the pickup head to the maximum allowable value of the focus drive signal when the signal reflected from the optical disc is detected, the fall of the pickup head to the minimum allowable value of the focus drive signal when the pickup head reaches the minimum allowable value of the focus drive signal, and the stand-by of the pickup head at the minimum allowable value of the focus drive signal when the pickup head reaches the minimum allowable value of the focus drive signal, after the rise of the pickup head to the maximum allowable value of the focus drive signal.

23. An adaptive focusing apparatus of an optical disc drive of an optical disc, comprising:

a disc driver rotating the optical disc;

a pickup head;

a focus servo controller that moves the pickup head to an optimal focus point;

a reflected signal detector detecting a signal reflected from the optical disc by the pickup head; and a signal processor preventing spikes between a surface of the optical disc and the pickup head in response to the signal reflected and generating a focus drive signal for the focus servo controller using an adaptive focus search algorithm comprising a static part and a dynamic part to reduce a focus search time.

24. The adaptive focusing apparatus of claim 23, wherein the disc driver comprises a spindle motor and the focus servo controller comprises a focus actuator, and wherein the static part is applied before a focusing starts or in an initialization operation, and, during the static part, the spindle motor of the disc driver is motionless and a swing margin of the focus actuator is adaptive.

25. The adaptive focusing apparatus of claim 24, wherein the static part allows the pickup head to fall from the optical disc to a minimum value of a focus drive signal during a focus search operation, allows the pickup head to rise close to the optical disc when the pickup head reaches the minimum value of the focus drive signal and to a maximum allowable value of the focus drive signal when the signal is reflected from the optical disc, and allows the pickup head to fall from the optical disc to a minimum allowable value of the focus drive signal when the pickup head reaches the maximum allowable value of the focus drive signal.

26. The adaptive focusing apparatus of claim 25, wherein the allowing of the pickup head to rise to the maximum allowable value of the focus drive signal and the allowing of the pickup head to fall to the minimum allowable value of the focus drive signal are repeated a predetermined number of times in consideration of a stability of the focusing.

27. The adaptive focusing apparatus of claim 25, wherein a vertical deviation of the pickup head to the maximum allowable value of the focus drive signal after the reflected signal is detected is set to be a fixed value.

28. The adaptive focusing apparatus of claim 25, wherein, after the signal reflected is detected, a vertical deviation of the pickup head to the maximum allowable value of the focus drive signal is set in proportion to a time interval from the reflection of the signal from the surface of the optical disc to the reflection of the signal from a recording layer.

29. The adaptive focusing apparatus of claim 25, wherein the reflected signal is a focus error signal that is a portion of a signal detected by the pickup head.

30. The adaptive focusing apparatus of claim 25, wherein the reflected signal is a sum signal of signals detected by the pickup head.

31. The adaptive focusing apparatus of claim 29, wherein a vertical deviation of the pickup head to the maximum allowable value of the focus drive signal after the reflected signal is detected is set by detecting a peak-to-peak time of the focus error signal.

32. The adaptive focusing apparatus of claim 24, wherein the swing margin is set to be an absolute margin to prevent damage to the optical disc drive.

33. The adaptive focusing apparatus of claim 24, wherein the swing margin is calculated every pass of the pickup head depending on an actual position of a center of S-curves of the signal reflected or an actual position of a focus point.

34. The adaptive focusing apparatus of claim 24, wherein in the static part, the signal processor does not allow the spindle motor to rotate, and checks a type of optical disc, a number of layers and adjusts a gain coefficient of a focus error signal.

35. The adaptive focusing apparatus of claim 23, wherein the dynamic part is used when the optical disc rotates in synchronization with a speed of the spindle motor of the disc driver and when a focus is deviated due to outer disturbances in a normal operation, instability of the optical disc drive, or damage to the optical disc.

36. The adaptive focusing apparatus of claim 35, wherein the pickup head moves to an initial position being a lowermost position of the surface of the optical disc to search for a focus point, where an actual value of the focus drive signal is the lowermost position of the surface of the optical disc.

37. The adaptive focusing apparatus of claim 36, wherein the dynamic allows the pickup head to rise from the initial position and to a maximum allowable value of the focus drive signal when the signal reflected from the optical disc is detected, and allows the pickup head to fall from the optical disc to a minimum allowable value of the focus drive signal when the pickup head reaches the maximum allowable value of the focus drive signal.

38. The adaptive focusing apparatus of claim 37, wherein the dynamic part allows the pickup head to stand-by at the minimum allowable value of the focus drive signal for a predetermined period of time before the rise of the pickup head.

39. The adaptive focusing apparatus of claim 37, wherein the dynamic part allows the pickup head to stand-by at the minimum allowable value of the focus drive signal when the pickup head reaches the minimum allowable value of the focus drive signal after the fall of the pickup head.

40. The adaptive focusing apparatus of claim 23, wherein the dynamic part of the focus search algorithm uses information about a revolution time of a spindle motor, a current time, and a moment of a safe lowermost potion of the surface of the disc to synchronize the moment of S-curves and the lowermost position of the surface of the disc.

41. The adaptive focusing apparatus of claim 23, wherein the dynamic part of the adaptive focus search algorithm comprises a 0-state, a 1-state, and a 2-state, and a 3-state, wherein in the 0-state, a time delay is created to prevent false conditions caused by false S-curves of a focusing error signal (FES) due to unpredictable relative positions of the pickup head and the surface of the disc, the 1-state forms a slowly ascending region of a focus drive signal (FOD) with a rising velocity of at least predetermined times less than a rising velocity of the pickup head, the 2-state forms an ascending region of the FOD, and the 3-state forms descending and flat horizontal regions of the FOD.

42. The adaptive focusing apparatus of claim 41, wherein after the 3-state, the 3-state is switched to the 2-state, and the states are repeated in an alternating order to search for the focus point.

* * * * *